United States Patent
Barra

(10) Patent No.: US 8,959,360 B1
(45) Date of Patent: *Feb. 17, 2015

(54) VOICE AUTHENTICATION AND COMMAND

(71) Applicant: Google Inc., Mountain View, CA (US)

(72) Inventor: Hugo B. Barra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,433

(22) Filed: Aug. 15, 2013

Related U.S. Application Data

(63) Continuation of application No. 13/622,790, filed on Sep. 19, 2012, now Pat. No. 8,543,834.

(60) Provisional application No. 61/699,082, filed on Sep. 10, 2012.

(51) Int. Cl.
| | |
|---|---|
| *G06F 21/00* | (2013.01) |
| *G10L 17/00* | (2013.01) |
| *G06F 21/32* | (2013.01) |
| *G06F 3/16* | (2006.01) |
| *H04L 29/06* | (2006.01) |
| *H04W 12/06* | (2009.01) |
| *G10L 17/24* | (2013.01) |

(52) U.S. Cl.
CPC .............. *G10L 17/005* (2013.01); *G06F 21/32* (2013.01); *G06F 3/167* (2013.01); *H04L 63/0861* (2013.01); *H04W 12/06* (2013.01); *G10L 17/24* (2013.01)
USPC ........... 713/186; 713/182; 713/183; 713/184; 713/185; 726/16; 726/17; 726/18; 726/19; 455/411; 704/246

(58) Field of Classification Search
CPC ..... G06F 21/32; G06F 3/167; H04L 63/0861; G10L 17/24; H04W 12/06
USPC ............... 713/182–186; 726/16–19; 704/246; 455/411

See application file for complete search history.

(56) References Cited

U.S. PATENT DOCUMENTS

| | | | |
|---|---|---|---|
| 5,127,043 A | 6/1992 | Hunt et al. | |
| 5,499,288 A | 3/1996 | Hunt et al. | |
| 7,054,819 B1 * | 5/2006 | Loveland | 704/273 |
| 7,966,183 B1 | 6/2011 | Yao et al. | |
| 2005/0273626 A1 * | 12/2005 | Pearson et al. | 713/186 |
| 2011/0275348 A1 * | 11/2011 | Clark et al. | 455/411 |
| 2012/0245941 A1 * | 9/2012 | Cheyer | 704/246 |
| 2012/0252411 A1 * | 10/2012 | Johnsgard et al. | 455/411 |

OTHER PUBLICATIONS

Hachman, M., "Unlock Your Phone with Your Voice with New Sensory Tech" pcmag.com [online]. May 2, 2012 [retrieved on Sep. 18, 2012]. Retrieved from Internet electronic mail: http://www.pcmag.com/article2/0,2817,2403854,00.asp, 5 pages.

* cited by examiner

*Primary Examiner* — Jeffrey Pwu
*Assistant Examiner* — Jayesh Jhaveri
(74) *Attorney, Agent, or Firm* — Fish & Richardson P.C.

(57) ABSTRACT

Methods, systems, and apparatus for voice authentication and command. In an aspect, a method comprises: receiving, by a data processing apparatus that is operating in a locked mode, audio data that encodes an utterance of a user, wherein the locked mode prevents the data processing apparatus from performing at least one action; providing, while the data processing apparatus is operating in the locked mode, the audio data to a voice biometric engine and a voice action engine; receiving, while the data processing apparatus is operating in the locked mode, an indication from the voice biometric engine that the user has been biometrically authenticated; and in response to receiving the indication, triggering the voice action engine to process a voice action that is associated with the utterance.

17 Claims, 4 Drawing Sheets

VOICE AUTHENTICATION AND COMMAND

CROSS-REFERENCE TO RELATED APPLICATION

This application is a continuation of U.S. patent application Ser. No. 13/622,790, filed on Sep. 19, 2012, entitled "Voice Authentication and Command," which claims priority to U.S. Provisional Application No. 61/699,082, filed on Sep. 10, 2012, entitled "Voice Authentication and Command," the entire contents of which are hereby incorporated by reference.

BACKGROUND

This specification relates to speech recognition and voice authentication.

Biometric security measures for electronic devices may include voice authentication measures that match vocal utterances with a biometric profile. Biometric authentication may be used to grant access to electronic devices, such as desktop computers, laptops, tablets, and mobile phones. Prior to voice authentication, electronic devices may be in a locked, or unauthenticated, mode. An electronic device which is in a locked mode may have limited functionality. For example, a locked laptop computer may deny access to communication functions or documents of the laptop computer, and a locked mobile phone may limit the operation of the mobile phone to making emergency phone calls.

Vocal utterances may also be used to command electronic devices by directing them to perform certain actions. A speech recognition service on an electronic device generally receives spoken input from a user, and transcribes the spoken words into text. To accomplish this, the speech recognition service may attempt to match the sounds of the spoken input with phonetic representations of textual words. The textual words may then be interpreted by the electronic device as instructions for performing various actions, such as displaying a map on a screen of the user device, requesting driving directions, making a phone call, or sending an electronic message.

SUMMARY

In general, the subject matter described in this specification involves using vocal utterances for authentication and command.

A user device operating in a locked mode, such as a laptop or cellular phone, may be given voice commands by a user. For example, the user of a cellular phone may speak, "call home," into a microphone of the cell phone.

The spoken utterance can be used to both perform an action associated with the utterance and authenticate the speaker. In particular, biometric authentication techniques may be used to authenticate the user while automatic speech recognition (ASR) services transcribe the spoken words into text from which a voice action may be derived. For example, the user's utterance, "call home," may be used to biometrically authenticate the user, unlocking the cell phone. The same utterance, "call home," may then be processed by the cell phone to perform an action—e.g., place a phone call to a contact associated with the word "home."

A user device performing voice authentication and command may operate in isolation or in a networked environment. A networked environment may include a radio communication network, a local area network (LAN), a wide area network (WAN), the Internet, or a combination thereof. A user device is an electronic device that is under the control of a user and is generally capable of sending and receiving data over a network. Example user devices include personal computers, mobile communication devices, and other devices that can send and receive data over a network. A user device typically includes components—such as a microphone, a display, a wireless communication antenna, and software applications—to facilitate the sending and receiving of data over the network.

In general, one innovative aspect of the subject matter described in this specification can be embodied in methods that include the actions of receiving, by a data processing apparatus that is operating in a locked mode, audio data that encodes an utterance of a user, wherein the locked mode prevents the data processing apparatus from performing at least one action; providing, while the data processing apparatus is operating in the locked mode, the audio data to a voice biometric engine and a voice action engine; receiving, while the data processing apparatus is operating in the locked mode, an indication from the voice biometric engine that the user has been biometrically authenticated; and in response to receiving the indication, triggering the voice action engine to process a voice action that is associated with the utterance.

These and other embodiments can each optionally include one or more of the following features. In response to receiving the indication, the data processing apparatus may be placed in an unlocked mode. The method may comprise triggering, prior to receiving the indication, the voice action engine to begin processing the voice action that is associated with the utterance. The voice action may be derived from a transcription of the utterance.

The voice action may be completed by the voice action engine without requiring the user to speak another utterance after the user has been biometrically authenticated.

Prior to the data processing apparatus receiving the indication, the voice biometric engine may: determine that the audio data fails to biometrically authenticate the user; cause the data processing apparatus to prompt the user for a second utterance; receive second audio data encoding a second utterance of the user; and determine that the user is biometrically authenticated based on the second audio data.

Other innovative aspects of the subject matter described in this specification can be embodied in methods that include the actions of receiving, by a data processing apparatus that is operating in a locked mode, audio data that encodes an utterance of a user, wherein the locked mode prevents the data processing apparatus from performing at least one action; providing, while the data processing apparatus is operating in the locked mode, the audio data to a voice biometric engine and a voice action engine; triggering the voice action engine to add a voice action that is associated with the utterance to a queue; receiving an indication from the voice biometric engine that the user has not been biometrically authenticated; and removing the voice action from the queue. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, by a data processing apparatus that is operating in a locked mode, audio data that encodes an utterance of a user, wherein the locked mode prevents the data processing apparatus from performing at least one action; providing, while the data processing apparatus is operating in the locked mode, the audio data to a voice biometric engine and a voice action engine; triggering, while the data processing apparatus is operating in the locked mode, the voice action engine to process a voice action that is associated with the utterance; after triggering the voice action engine, receiving an indication from the voice biometric engine that the user has been biometrically authenticated based on the audio data. Other embodiments of this aspect include corresponding systems, apparatus, and computer programs, configured to perform the actions of the methods, encoded on computer storage devices.

These and other embodiments can each optionally include the following feature: in response to receiving the indication, the data processing apparatus may be placed in an unlocked mode.

Particular embodiments of the subject matter described in this specification can be implemented so as to realize one or more of the following advantages. Using a single utterance for voice authentication and command reduces time spent by a user providing commands to a locked user device to cause the user device to perform an action. A separate passphrase is not required to access a user device, and voice actions associated with commands uttered by an unauthenticated user will not be performed. In addition, once a user device has been authenticated and a vocal command has been processed, the device may be in an unlocked mode and available to process further commands or input from the user.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
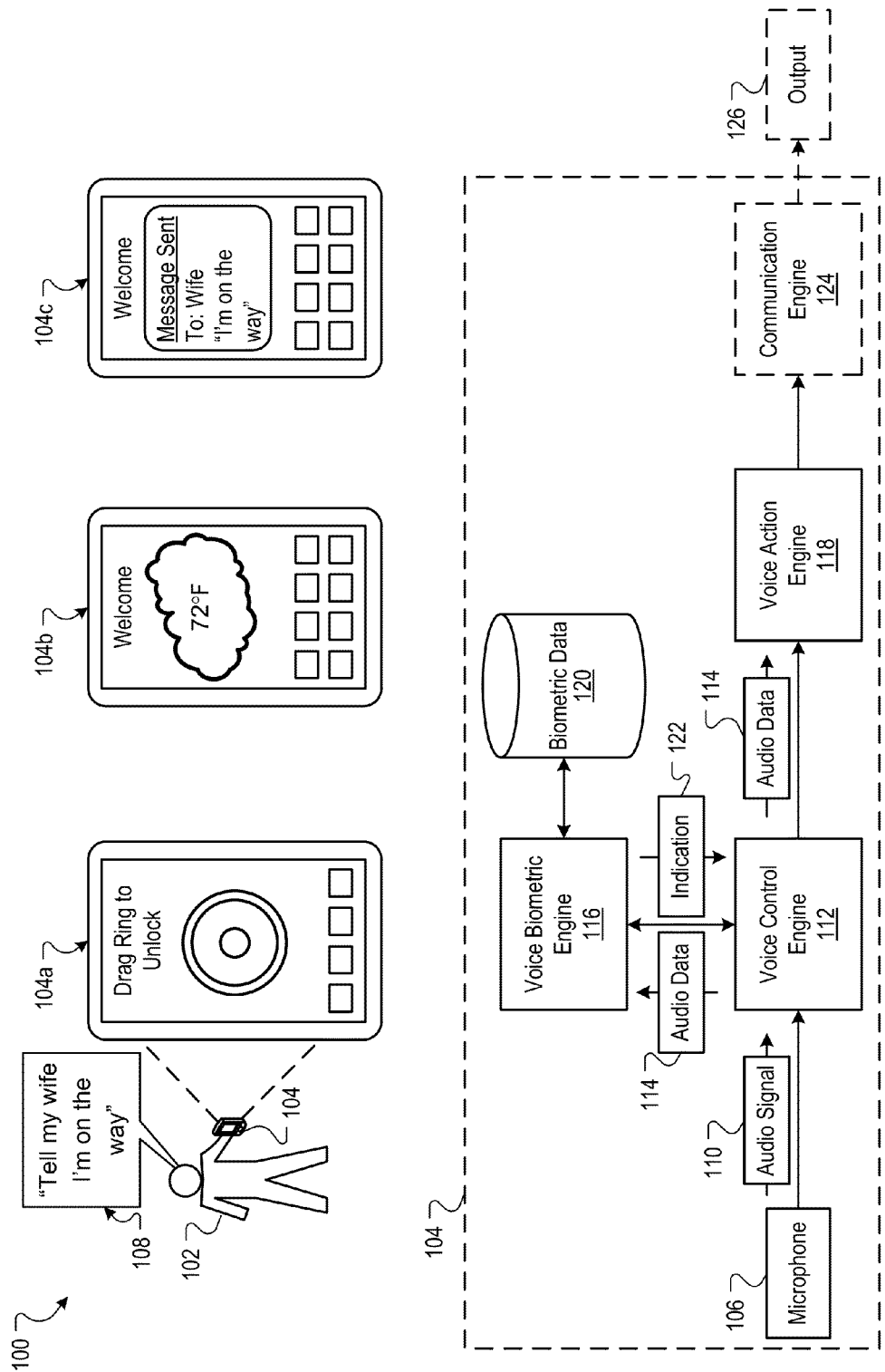
FIG. 1 is a diagram of an example environment in which a vocal utterance is used for authentication and command.

FIG. 1 is a diagram of an example environment 100 in which a vocal utterance is used for authentication and command. The example environment 100 includes a user 102 and a user device 104, such as a mobile phone. Three different representations of the user device 104 are also depicted in three different states, as shown in 104a, 104b, and 104c. For example, user device 104a is in a locked mode, which generally means the user device 104a is secured and has limited functionality. For example, a locked user device 104a may not be capable of sending audio or text messages, running particular applications, displaying and sending electronic mail, and/or making phone calls.

In some implementations, the user device 104a may be in a listening mode while it is locked. When in a listening mode, a microphone 106 of the user device is active and capable of receiving audible utterances. In some implementations, user interaction with the locked user device 104a, such as a button press, is required to place the user device into a listening mode. When the user 102 speaks, the vocal utterance 108 is converted to an analog audio signal 110 by the microphone and transmitted to a voice control engine 112 for further processing. In some implementations, the microphone 106 may convert an analog audio signal into digital audio data that encodes the user's utterance, and transmit the digital audio data to the voice control engine 112. In another implementation, the voice control engine 112 may convert the analog audio signal 110 into digital audio data.

The voice control engine 112 provides audio data 114 that encodes the user's utterance 108 to both a voice biometric engine 116 and a voice action engine 118. The voice biometric engine 116 determines whether the audio data 114 is sufficient to biometrically authenticate the user 102. Biometric authentication may be performed using any suitable method. For example, the voice biometric engine 116 may compare the audio data 114 to one or more biometric profiles previously stored by the user in a biometric data store 120. Based on a comparison of the audio data 114 with the biometric data 120, the voice biometric engine 116 may determine whether the audio data 114 is sufficient to biometrically authenticate the user. After making the determination, the voice biometric engine sends an indication 122 to the voice control engine 112, and the indication 112 specifies whether biometric authentication was successful, or whether the authentication failed.

In some implementations, if the voice data 114 fails biometric authentication, the voice control engine 112 may prompt the user 102 for a second utterance. For example, a textual prompt may be displayed on a display of the user device 104, or an audio signal or instruction may be communicated to the user 102. The voice control engine 112 may obtain second audio data encoding a second utterance of the user 102 and provide the second audio data to the voice biometric engine 116 to attempt voice authentication again. In some implementations, a user may attempt voice authentication multiple times, or the user may provide other input to authenticate instead, such as entering a numeric password on a keypad of the user device.

In some implementations, the voice control engine 112, in response to receiving an indication that the user has been biometrically authenticated, causes the user device to be placed in an unlocked mode. In the example environment 100, the user device 104b appears in an unlocked state. The user device 104b, once unlocked, may be used to perform any number of actions. For example, the voice control engine 112, in response to receiving a positive indication of authentication, may trigger the voice action engine 118 to process a voice action that is associated with the user's utterance 108. The user device shown in 104c is processing, or has completed processing, the action specified by the user's utterance 108.

The voice action engine 118 processes the audio data 114 received from the voice control engine 112. In some implementations, the voice action engine 118 is connected to or includes an automatic speech recognition (ASR) service or subsystem that transcribes the audio data into text. An ASR service may attempt to match the sounds of the audio data with phonetic representations of textual words. In some implementations, the ASR service operates on a network connected server computer. For example, the voice action engine 118 may provide the audio data 114 to a server computer via wireless network and, in response to receiving the audio data, an ASR service on the server computer transcribes the audio data to text and transmits the text to the voice action engine 118.

Once the audio data 114 is converted to text, the text is processed by the voice action engine 118 to determine an action. In the example environment 100, the user's utterance 108 is "Tell my wife I'm on the way." The voice action engine 118 may determine that "tell" specifies the action to be taken by the user device. For example, "tell" may be associated with an action, such as a text message, a voice message, or an e-mail. The specific actions associated with particular words may be pre-configured and/or changed using user preferences.

Once the action is determined, the voice action engine 118 may—in this example—determine the intended recipient of the text or voice message, e.g., "my wife." After determining the action to be taken, and the intended recipient, the voice action engine 118 may determine that the remainder of the textual transcription, e.g., "I'm on the way," is the message to be transmitted.

The voice action engine 118 may use any suitable method for parsing the text and deriving an action from the text. In some implementations, multiple actions may be derived from the same utterance. For example, if a user's utterance is "Tell my wife I'm on the way and show me the current weather," the voice action engine 118 may determine there are two separate actions to be derived from the text, separated by the word "and." In some implementations, the voice action engine 118 may cause a prompt to be communicated to the user of the user device to confirm the user's utterance was properly interpreted.

In some implementations, the voice action engine 118 determines whether the action derived from the utterance 108 requires authentication to perform. By way of example, some actions—such as making emergency phone calls, obtaining the time/date, and/or obtaining weather information—may be performed when a user device is in locked mode, without authentication. Some actions—such as sending a text message, obtaining navigation directions, and/or opening a web page—may require that the user device be unlocked or authenticated. In some implementations, actions that require authentication may be pre-configured and/or changed using user preferences. If the voice action engine 118 determines that the action derived from the utterance may be performed without authentication, it may process the action as soon as it has been derived from the audio data 114.

If, on the other hand, processing the voice action derived from a user's utterance requires that the user device be unlocked, or authenticated, the voice action engine 118 will not process the action until the user device is unlocked or authenticated. In some implementations, the voice action engine 118 may add a voice action that is awaiting authorization to a queue for actions. Multiple voice actions may be queued in this manner. Once the user device 104 has been authenticated, the voice control engine 112 may trigger the voice action engine 118 to obtain the voice action(s) from the queue and process the voice action(s).

In some implementations, the voice action engine 118 may begin processing the audio data when it is received, without requiring authentication to be completed. For example, the voice action engine 118 may process the audio data to determine the action specified by the audio data 114 prior to authentication being completed. Once an action has been derived from the audio data 114, it may be processed if the action does not require authentication, or queued if authentication is required. If the voice action engine 118 receives a positive indication of authentication, it may complete processing of the queued action. If, on the other hand, authentication has failed, the voice action engine 118 may remove the action from the queue.

In the example environment 100, the action derived from the user's utterance 108 is a text message. To complete processing of the action, the voice action engine 118 causes the text message "I'm on the way" to be sent to the user's wife. For example, the voice action engine 118 may send instructions to the communication engine 124, which produces output 126 in the form a wireless communication signal that includes data specifying the text message.

While the voice control engine 112, voice biometric engine 116, voice action engine 118, and communication engine 124 are each described as separate components of the user device 104, they may be embodied in any combination of engines and data processing apparatuses, or in a single engine or data processing apparatus. The order of the components and the particular embodiment shown in the example environment 100 is one example way in which the subject matter described herein may be implemented.

Figure 2:
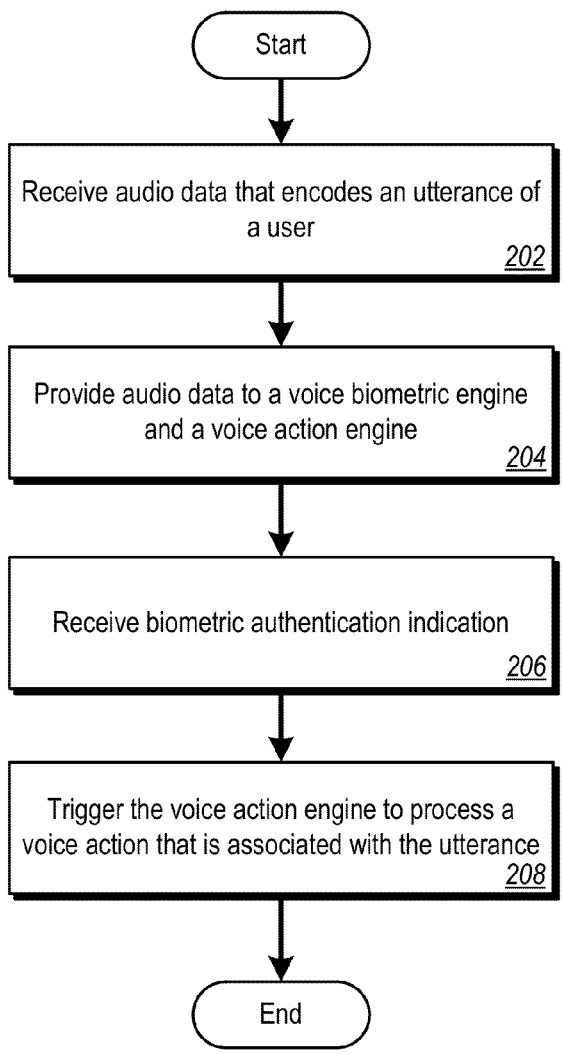
FIG. 2 is a flow chart of an example process for performing voice authentication and command.

FIG. 2 is a flow chart of an example process 200 for performing voice authentication and command. The process may be used by a data processing apparatus that is used to realize one or more of the systems described with reference to FIG. 1, such as the voice control engine 112. In particular, the process 200 may use a vocal utterance to authenticate a user device and use the same vocal utterance to process an action associated with the utterance.

The process 200 receives audio data that encodes an utterance of a user (202). In some implementations the audio data may be received by a data processing apparatus that is operating in a locked mode. The utterance may be spoken by a user and converted into an analog signal by a microphone of a user device. The user device may then convert the analog signal into a digital audio data for further processing.

The audio data is provided to a voice biometric engine and a voice action engine (204). The audio data may be provided to the voice biometric engine and the voice action engine while the data processing apparatus is still operating in locked mode. The voice biometric engine determines whether to authenticate the user based on the audio data. The voice action engine processes the audio data to determine a voice action associated with the audio data.

The process (200) receives an indication from the voice biometric engine that the user has been biometrically authenticated. For example, the voice biometric engine may have determined, based on the audio data that encodes the user's utterance, that the user is authenticated. Accordingly, an indication of positive biometric authentication may be received. The data processing apparatus may still be operating in locked mode when the indication is received.

The process (200), in response to receiving the indication, triggers the voice action engine to process a voice action that is associated with the utterance. In some implementations, the voice action may be derived from the utterance. For example, if the user's utterance is "Give me directions to home," the action derived from audio data encoding that utterance may be specify that a navigation application of a user device should be activated, and that the navigation application should be instructed to obtain driving directions from the user device's current location to a location associated with "home."

In some implementations, the voice action is completed by the voice action engine without requiring the user to speak another utterance after the user has been biometrically authenticated. For example, the same utterance may be used to both authenticate the user and specify a voice action to be processed by the voice action engine.

In some implementations, the process (200), in response to receiving the indication, places the data processing apparatus into an unlocked mode. This action may take place before, after, or while the voice action associated with the utterance is processed.

In some implementations, the process (200) triggers the voice action engine to begin processing the voice action that is associated with the utterance prior to receiving the indication. For example, the voice action engine may obtain a transcription of the audio data into text, parse the text, and queue a voice action specified by the transcribed data prior to receiving an authentication indication.

In some implementations, prior to receiving the authentication indication, the voice biometric engine performs operations that include: determining that the that the audio data fails to biometrically authenticate the user, causing the data processing apparatus to prompt the user for a second utterance, receiving audio data that encodes a second utterance of the user, and determining that the user is biometrically authenticated based on the audio data. The voice biometric engine may cause the data processing apparatus to prompt the user for additional utterances if biometric authentication has not yet succeeded.

Figure 3:
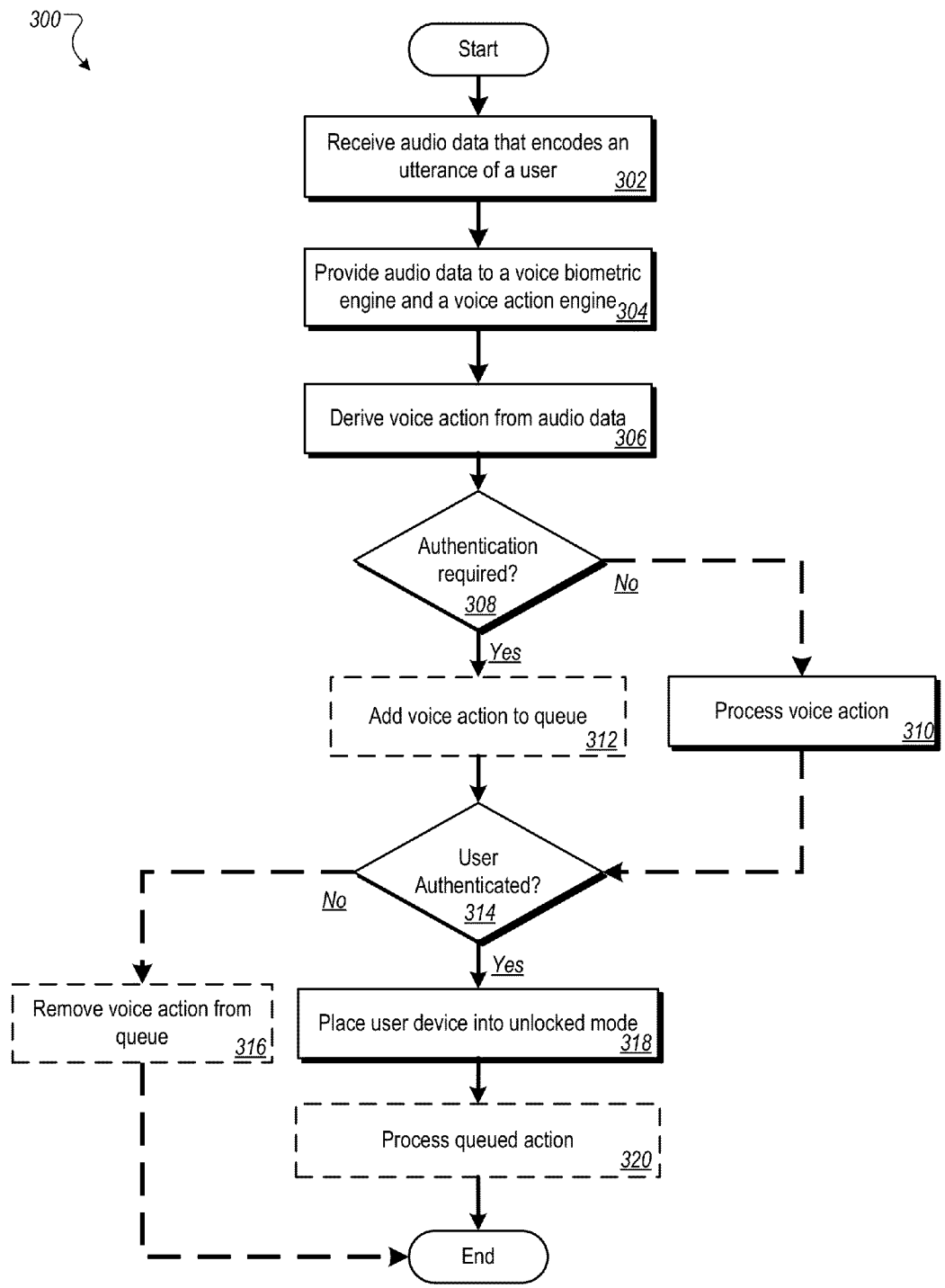
FIG. 3 is a flow chart of a second example process for performing voice authentication and command.

FIG. 3 is a flow chart of a second example process 300 for performing voice authentication and command. The process may be used by a data processing apparatus that is used to realize one or more of the systems described with reference to FIG. 1, such as the voice control engine 112. As with the process 200 described with reference to FIG. 2, the process 300 may use a vocal utterance to authenticate a user device and use the same vocal utterance to process an action associated with the utterance.

The process 300 receives audio data that encodes an utterance of a user (302) and provides the audio data to a voice biometric engine and a voice action engine (304). For example, the utterance encoded in the audio data and provided to the voice biometric engine and voice action engine may be "what is the weather like?"

The process 300 obtains a voice action from the audio data (306). For example, the process 300 may transcribe the utterance into text, and parse the text to determine the voice action. The utterance, "what is the weather like," may be parsed and processed to determine that the voice action is to provide the current weather conditions.

The process 300 may determine whether authentication is required to process the voice action (308). In some implementations, authentication may be required to process certain actions, but not others. If no authentication is required, the voice action is processed (310), and the process 300 continues to step 314. For example, providing the current weather is a voice action that, in some implementations, does not require authentication. Accordingly, processing the voice action may cause a user device running the process 300 to display the current weather conditions.

If authentication is required, the process may add the voice action to a queue (312). In some implementations, a queue is only used if the device has not yet been authenticated by the voice action. In some situations, authentication may occur before the voice action is determined. In this case, the voice action may be immediately processed or discarded as soon as the voice action has been determined, without the need to add it to a queue.

Once the voice action is either processed or added to a queue, the process 300 determines whether the user has been authenticated (314). In some implementations, this may be determined by comparing the audio data to biometric data that stores a voice profile for an authenticated user. The process 300 may pause at step 314 while waiting for authentication to complete. In some implementations, the process 300 will wait at step 314 for a threshold period of time before determining that authentication has failed due to a timeout.

If the user is not authenticated, the process 300 may, if applicable, remove any voice actions from the queue (316) and end. If the user is authenticated, the process 300 places the user device running the process 300 into an unlocked mode (318) and, if applicable, processes any queued voice actions (320) before ending. In the foregoing example, the voice action for displaying the current weather may have already been processed, in which case failure to authenticate simply results in the process ending 300. Successful authentication, on the other hand, will cause the user device to be placed in an unlocked mode prior to the process 300 ending.

Figure 4:
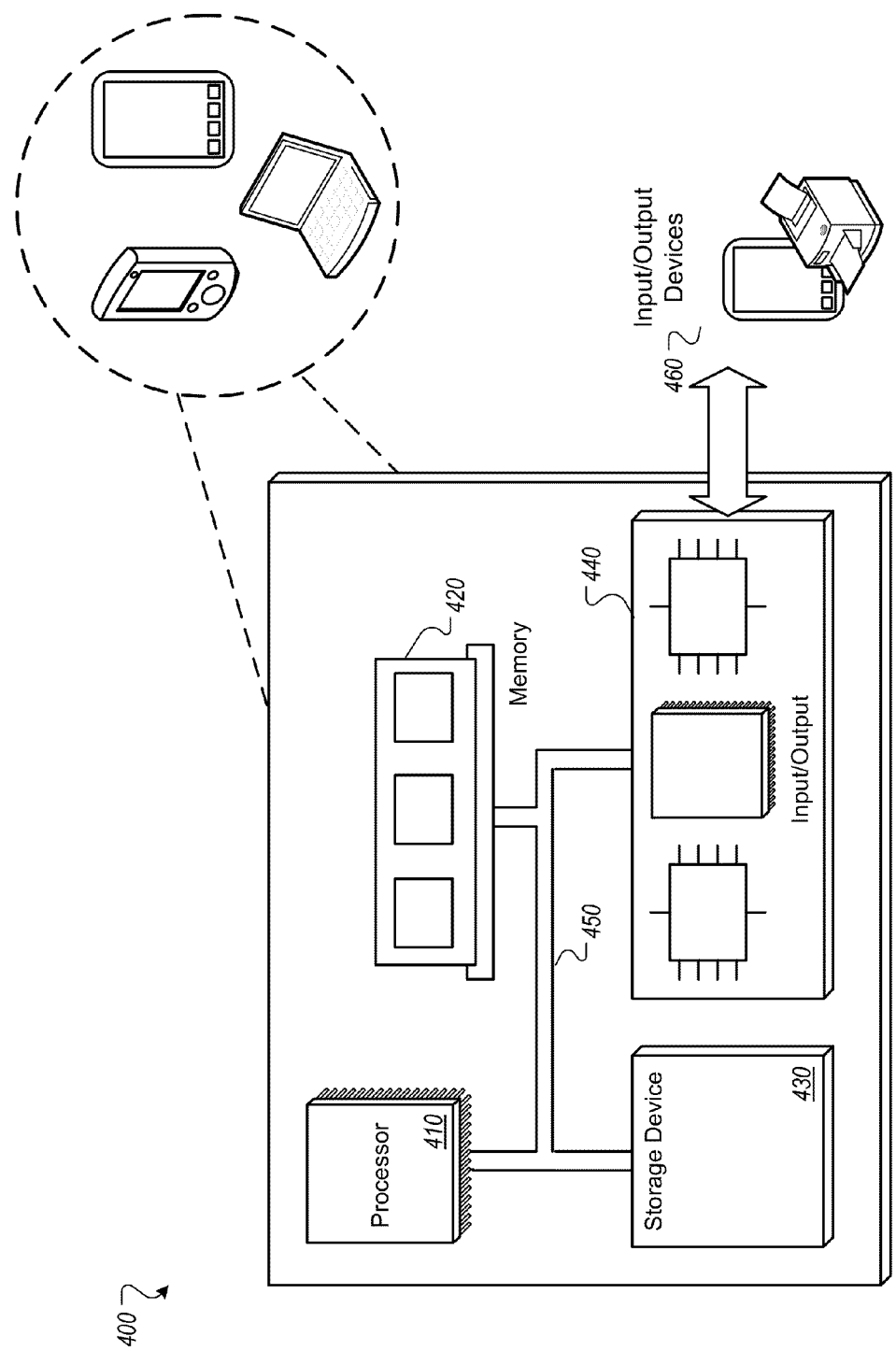
FIG. 4 is a block diagram of an example data processing apparatus.

FIG. 4 is a block diagram of an example data processing apparatus 400 that can be used to perform operations described above. The apparatus 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the apparatus 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the apparatus 400. In one implementation, the storage device 430 is a computer-readable medium. In various different implementations, the storage device 430 can include, for example, a hard disk device, an optical disk device, a storage device that is shared over a network by multiple computing devices, e.g., a cloud storage device, or some other large capacity storage device.

The input/output device 440 provides input/output operations for the apparatus 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example data processing apparatus has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

What is claimed is:

1. A computer readable storage device encoded with a computer program, the program comprising instructions that when executed by a data processing apparatus cause the data processing apparatus to perform operations comprising:

receiving, by the data processing apparatus that is operating in a locked mode, audio data that encodes an utterance of a user, wherein the locked mode prevents the data processing apparatus from performing at least one action;

providing, while the data processing apparatus is operating in the locked mode, the audio data to a voice biometric engine and a voice action engine;

receiving, while the data processing apparatus is operating in the locked mode, data from the voice action engine that identifies a voice action that is associated with the utterance;

determining, while the data processing apparatus is operating in the locked mode, that the voice action that is associated with the utterance is classified as a voice action that does not require authentication to perform;

based on determining that the voice action that is associated with the utterance is classified as a voice action that does not require authentication to perform, processing, while the data processing apparatus is operating in the locked mode, the voice action that is associated with the utterance; and after processing the voice action that is associated with the utterance, receiving, while the data processing apparatus is operating in the locked mode, an indication from the voice biometric engine, the indication specifying whether the user has been biometrically authenticated.

2. The computer readable storage device of claim 1, wherein the indication specifies that the user has successfully been biometrically authenticated, and wherein the operations further comprise:
in response to receiving the indication, placing the data processing apparatus in an unlocked mode.

3. The computer readable storage device of claim 1, wherein the indication specifies that the user has not been biometrically authenticated, and wherein the operations further comprise:
in response to receiving the indication, causing the data processing apparatus to remain in a locked mode.

4. The computer readable storage device of claim 3, wherein the operations further comprise:
prompting the user for a second utterance;
receiving second audio data encoding a second utterance of the user; and
providing, while the data processing apparatus is operating in the locked mode, the second audio data to the voice biometric engine;
receiving a second indication from the voice biometric engine, the second indication specifying that the user has been successfully biometrically authenticated; and
in response to receiving the second indication, placing the data processing apparatus in an unlocked mode.

5. The computer readable storage device of claim 1, wherein the voice action is derived from a transcription of the utterance.

6. A method performed by data processing apparatus, the method comprising:
receiving, by the data processing apparatus that is operating in a locked mode, audio data that encodes an utterance of a user, wherein the locked mode prevents the data processing apparatus from performing at least one action;
providing, while the data processing apparatus is operating in the locked mode, the audio data to a voice biometric engine and a voice action engine;
receiving, while the data processing apparatus is operating in the locked mode, data from the voice action engine that identifies a voice action that is associated with the utterance;
determining, while the data processing apparatus is operating in the locked mode, that the voice action that is associated with the utterance is classified as a voice action that does not require authentication to perform;
based on determining that the voice action that is associated with the utterance is classified as a voice action that does not require authentication to perform, processing, while the data processing apparatus is operating in the locked mode, the voice action that is associated with the utterance; and
after processing the voice action that is associated with the utterance, receiving, while the data processing apparatus is operating in the locked mode, an indication from the voice biometric engine, the indication specifying whether the user has been biometrically authenticated.

7. The method of claim 6, wherein the indication specifies that the user has successfully been biometrically authenticated, and wherein the method further comprises:
in response to receiving the indication, placing the data processing apparatus in an unlocked mode.

8. The method of claim 6, wherein the indication specifies that the user has not been biometrically authenticated, and wherein the method further comprises:
in response to receiving the indication, causing the data processing apparatus to remain in a locked mode.

9. The method of claim 8, further comprising:
prompting the user for a second utterance;
receiving second audio data encoding a second utterance of the user; and
providing, while the data processing apparatus is operating in the locked mode, the second audio data to the voice biometric engine;
receiving a second indication from the voice biometric engine, the second indication specifying that the user has been successfully biometrically authenticated; and
in response to receiving the second indication, placing the data processing apparatus in an unlocked mode.

10. The method of claim 6, wherein the voice action is derived from a transcription of the utterance.

11. The method of claim 6, wherein the locked mode prevents the data processing apparatus from performing at least one action.

12. A system comprising:
a data processing apparatus; and
a data store storing instructions executable by the data processing apparatus that, upon execution by the data processing apparatus, cause the data processing apparatus to perform operations comprising:
receiving, by the data processing apparatus that is operating in a locked mode, audio data that encodes an utterance of a user, wherein the locked mode prevents the data processing apparatus from performing at least one action;
providing, while the data processing apparatus is operating in the locked mode, the audio data to a voice biometric engine and a voice action engine;
receiving, while the data processing apparatus is operating in the locked mode, data from the voice action engine that identifies a voice action that is associated with the utterance;
determining, while the data processing apparatus is operating in the locked mode, that the voice action that is associated with the utterance is classified as a voice action that does not require authentication to perform;
based on determining that the voice action that is associated with the utterance is classified as a voice action that does not require authentication to perform, processing, while the data processing apparatus is operating in the locked mode, the voice action that is associated with the utterance; and
after processing the voice action that is associated with the utterance, receiving, while the data processing apparatus is operating in the locked mode, an indication from the voice biometric engine, the indication specifying whether the user has been biometrically authenticated.

13. The system of claim 12, wherein the indication specifies that the user has successfully been biometrically authenticated, and wherein the operations further comprise:
in response to receiving the indication, placing the data processing apparatus in an unlocked mode.

14. The system of claim 12, wherein the indication specifies that the user has not been biometrically authenticated, and wherein the operations further comprise:
in response to receiving the indication, causing the data processing apparatus to remain in a locked mode.

15. The system of claim 12, wherein the operations further comprise:
prompting the user for a second utterance;
receiving second audio data encoding a second utterance of the user; and providing, while the data processing apparatus is operating in the locked mode, the second audio data to the voice biometric engine;

receiving a second indication from the voice biometric engine, the second indication specifying that the user has been successfully biometrically authenticated; and in response to receiving the second indication, placing the data processing apparatus in an unlocked mode.

16. The system of claim 12, wherein the voice action is derived from a transcription of the utterance.

17. The system of claim 12, wherein the locked mode prevents the data processing apparatus from performing at least one action.

* * * * *